United States Patent [19]

Hensel et al.

[11] 3,857,886

[45] Dec. 31, 1974

[54] PROCESS FOR THE PRODUCTION OF PURE N-ALKYL FORMAMIDES

[75] Inventors: Jörg Hensel; Hans Schaefer; Gerd Schreyer, all of Grossauheim, Germany

[73] Assignee: Deutsche Gold- und Silber-Scheideanstalt vormals Roessler, Frankfurt, Germany

[22] Filed: Aug. 29, 1972

[21] Appl. No.: 284,544

[30] Foreign Application Priority Data
Sept. 3, 1971 Germany............................. 2144229

[52] U.S. Cl. ......................... 260/561 R, 260/562 R
[51] Int. Cl............................................ C07c 103/30
[58] Field of Search ................................. 260/561 R

[56] References Cited
UNITED STATES PATENTS

| 2,602,817 | 7/1952 | Heider ........................... 260/561 R |
| 2,606,207 | 8/1952 | Heider ........................... 260/561 R |
| 3,338,967 | 8/1967 | Potts et al. ................... 260/561 R X |
| 3,509,212 | 4/1970 | Fonken et al. ................... 260/561 R |
| 3,530,153 | 9/1970 | Potts et al. ................... 260/561 R X |

FOREIGN PATENTS OR APPLICATIONS

| 516,906 | 1/1953 | Belgium .......................... 260/561 R |

OTHER PUBLICATIONS

Chem. Abstracts, Vol. 67, 1967, 74725u.
Chem. Abstracts, Vol. 67, 1967, 74726w.

Primary Examiner—Lewis Gotts
Assistant Examiner—Ethel G. Love
Attorney, Agent, or Firm—Cushman, Darby & Cushman

[57] ABSTRACT

Pure N-alkyl formamides are obtained by reacting an olefin or alcohol with hydrogen cyanide according to the Ritter reaction in the presence of an acid. The N-alkyl formamide formed is extracted from the unneutralized acid reaction solution with a polar acid stable organic solvent. The N-alkyl formamide can be recovered from the organic solvent in conventional manner, e.g., by distillation, for example in a vacuum.

21 Claims, No Drawings

PROCESS FOR THE PRODUCTION OF PURE N-ALKYL FORMAMIDES

The present invention is directed to a process for the recovery of N-alkyl formamides from acidic aqueous solutions thereof.

Amides can be produced by the so-called Ritter reaction. The invention is particularly concerned with the continuous separation of N-alkyl and N-cycloalkyl formamides from the reaction solutions in the Ritter reaction. The reaction solutions are formed by the reaction of hydrogen cyanide with the appropriate alcohol or unsaturated hydrocarbon in a strong acid. These types of formamides are employed as printing adjuvants or in the production of textile assistants or are converted into amines.

The formation of the N-alkyl and N-cycloaklyl formamides is known in itself. The procedure is described for example by Ritter and Kalisch (J. Amer. Chem. Soc., Vol. 70 (1948), page 4,048) as well as in U.S. Pat. No. 2,773,097. As the acid reaction medium the first citation uses a mixture of acetic acid and sulfuric acid. In the second citation there is used only sulfuric acid in high concentration. The entire disclosures of the Ritter, et al., article and U.S. Pat. No. 2,773,097 are hereby incorporated by reference.

Until now, however, there have been considerable difficulties in isolating the substituted formamides produced by the Ritter reaction since it was considered that in order to obtain pure reaction products there must be neutralized the strong acid used as reaction medium and catalyst. Thus for example, according to German Pat. No. 1,196,185 the isolation of the N-alkyl formamide is accomplished by neutralization of the reaction solution and separation of the formamide as the separated phase. The further decomposition to the corresponding amines then takes place for example according to German Pat. No. 1,059,468 by saponification in alkaline medium. The entire disclosure of German Pat. Nos. 1,196,185 and 1,059,468 is hereby incorporated by reference.

Another method is proposed in German Pat. No. 870,856. The intermediate isolation of the formamide is eliminated and the saponification to the amine is carried out in acid solution. In this process, however, the amine can only be set free after the acid is neutralized.

This required neutralization in each case results in a considerable amount of salt as by-product which is a great burden in large scale industrial operation. The resulting amount of salt after separation of the N-alkyl or N-cycloalkyl formamide must first be recovered from the mother liquor and then be used in some form. It is not possible to send this large amount of salt into the sewage system since it presents too heavy a load. Besides there is a loss of acid by the salt formation which is present in considerable amount corresponding to the reaction formula for the formation of N-substituted formamide.

It is the idea of the present application to devise a process for the production of N-alkyl, N-cycloalkyl and N-aralkyl formamide wherein salt formation is avoided.

It has now been found that the formation of salt as a byproduct can be completely avoided if the N-alkyl formamides formed in the Ritter reaction in known manner are extracted from the unneutralized, acid reaction solution with polar acid stable solvents and in known manner recovered from the extract, for example by subsequent distillation, in a given case in a vacuum, e.g. 100 to 0.01 Torr.

As N-alkyl, N-cycloalkyl and N-aralkyl formamides there can be isolated by the process of the present invention any of those made by the Ritter reaction (see J. Amer. Chem. Soc., Vol. 70, page 4,048 and U.S. Pat. No. 2,773,097) from alcohols or olefins and hydrocyanic acid. These include N-isopropyl formamide, N-sec. butyl formamide, N-t-butyl formamide, N-alpha methylbenzyl formamide, N-alpha, alpha dimethylbenzyl formamide, amyl formamide, N-t-amyl formamide, N-1-methylcyclohexyl formamide, N-1-methyl hexyl formamide, N-t-hexyl formamide, N-t-octyl formamide, N-sec.- amyl formamide, N-di-t-octyl formamide, N-nonyl formamide, N-1-methyl octyl formamide, N-decyl formamide, N-cyclohexyl formamide, N-cyclopentyl formamide, N-1-methyl nonyl formamide, N-dodecyl formamide and N-1-methylundecyl formamide. Readily producible N-alkyl formamides by the Ritter process are N-isopropyl formamide, N-sec. butyl formamide, N-t-butyl formamide, N-1-methyl amyl formamide, N-t-amyl formamide and above all, the N-formamide made from isobutylene, that is N-t-butyl formamide.

The aqueous acid solution which is to be extracted can have any pH below pH = 7 within the range of stability of the extracting solvent. The acid used to form the N-alkyl formamide and which is present can be sulfuric acid, a mixture of acetic acid and sulfuric acid, hydrochloric acid, phosphoric acid, trifluoroacetic acid or any other acid which gives the required acidity.

As acid stable polar solvents there can be used tertiary phosphate esters and urea derivatives, preferably tetra substituted ureas and chlorinated hydrocarbons, specially in combination with carboxylic acids of saturated hydrocarbons with 1 to 9 carbon atoms.

As phosphate esters there can be used alkyl, aryl and alkaryl phosphates of the general formula

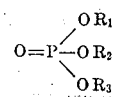

where $R_1$, $R_2$ and $R_3$ are alkyl, aryl and alkaryl groups having a total of 8 to 39 carbon atoms. Thus there can be used tributyl phosphate, trioctyl phosphate, tri-2-ethylhexyl phosphate, diphenyl octyl phosphate, tris decyl phosphate, triisodecyl phosphate, diphenyl cresyl phosphate, tris dodecyl phosphate, tris tridecyl phosphate, ethyl dipropyl phosphate, diphenyl isodecyl phosphate, dioctyl phenyl phosphate, tris sec. butyl phosphate, tribenzyl phosphate, tricyclohexyl phosphate, tri 2,4-xylenyl phosphate, triamyl phosphate, butyl amyl heptyl phosphate. There can be used mixtures of phosphates. Preferred are tributylphosphate or trioctylphosphate.

As urea derivatives there can be used compounds of the formula

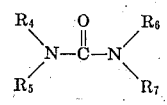

where $R_4$, $R_5$, and $R_7$ individually are alkyl of 1 to 12 carbon atoms (or alkyl substituted by $OR_8$ where $R_8$ is alkyl of 1 to 12 carbon atoms) preferably 1 to 5 carbon atoms and $R_4$ and $R_5$ joined together with the adjacent N form a 5 to 6 atom ring having zero or 1 additional O,S or N atom and $R_6$ and $R_7$ together are defined as $R_4$ and $R_5$ together. Examples of preferred substituted ureas are N, N-diethyl-N',N'-dimethylurea and N,N-diethyl-N',-N'-di-n-butyl urea. Other suitable substituted ureas include, N,N-dimethyl carbonyl-N'-morpholine, tetraethyl urea, tetrapropyl urea, tetraisopropyl urea, N,N,N'-trimethyl-N'-ethyl urea, N,N'-dimethyl N,N'-di (dodecyl)urea, N,N'-dimethyl, N,N'-diamyl urea, tetracyclohexyl urea, N,N',N'-trimethyl-N-cyclohexyl urea, N,N'-diethyl N,N'-di (4-methylcyclohexyl) urea, N,N-diethyl carbonyl piperidine, carbodimorpholine, N,N-dimethyl carbonoyl-N'-thiomorpholine, N,N-diethyl carbonyl N'-oxazolidine, N,N,N'-trimethyl-N'-3-methoxy-n-propyl urea, N,N,N'-trimethyl-2,3,5(or 6)-methyl-4-methoxy-1-cyclohexyl urea, N-methoxyethyl, N-methyl,N',N'-diethyl urea, N-amyloxymethyl, N,N',N'-trimethyl urea, and N,N-dipropoxypropyl, N',N'-diethyl urea.

There can be used mixtures of phosphates and substituted ureas, as, for example a mixture of tri-n-butyl phosphate and N',N'-diethyl-N'N'-dimethyl urea (e.g., 50 : 50).

As chlorinated hydrocarbons can be used, e.g., chloroform and methylene chloride or mixtures thereof. The chlorinated hydrocarbons can be combined with carboxylic acids with 1 to 9 carbon atoms, especially with acetic acid, propionic acid, isobutyric acid, n-valeric acid, caproic acid and trichloroacetic acid or combination of carboxylic acids. Preferred are chloroform, methylenechloride, alone or in combination with acetic acid or isobutyric acid. The amount of polar solvent is given by the distribution coefficient. Unless otherwise indicated all parts and percentages are by weight.

It is not necessary to use the acid stable polar organic solvent alone. Thus up to 50 percent of the polar organic solvent can be replaced by an aliphatic cycloaliphatic or aromatic hydrocarbon. The hydrocarbon is preferably free of nonbenzenoid unsaturation. The hydrocarbon can have a density of up to 0.90. By this means the density difference between the extraction agent and the solution to be extracted is increased and thereby a quicker phase separation is attained between the extract and the solution to be extracted. For best results sufficient hydrocarbon is added that the density difference between the mixture of hydrocarbon and acid stable polar solvent to the N-alkyl formamide is not smaller than 0.05. Examples of suitable hydrocarbons include hexane, heptane, petroleum ether, benzene, pentane, 2-methylpentane, 3-methyl pentane, 2,2-dimethylbutane, 3-ethyl pentane, n-octane, isooctane, 2,3,4- trimethyl pentane, nonane, decane, cyclohexane, cyclopentane, methyl cyclopentane, methyl cyclohexane, p-methane, pinane, toluene, o-xylene, m-xylene, p-xylene, mixed xylenes, ethyl benzene, butylbenzene, t-butylbenzene, butyl toluene, mesitylene, cymene, cumene, alkyl benzene mixtures boiling at 158° – 186°C. or 184°–202°C.

Room temperature is best suited for the extraction. In general temperatures of 10° – 35°C. are suitable but lower temperatures to 5°C. can be used or high temperatures up to 90°C. are also possible, if they do not change the extraction mixture.

If the extraction mixture is so strongly acid that the extraction agent decomposes and thereby the extraction is disturbed the pH can be raised (i.e., the acidity reduced) by diluting the aqueous acid with water to give a weight ratio of acid to water of from 1 : 0.5 to 1 : 15 for example. However, as stated above the reaction medium is always maintained in the acid pH range.

Normally a small part of the acid as well as a correspondingly small part of water based on the total amount of formamide and acid is extracted.

In order to reduce this amount of acid the extract in a given case can be washed with water. The water added for this washing and which contains acid after the washing, can be used before the extraction to dilute the concentrated reaction solution.

The extraction can be carried out in the conventional extraction apparatuses, for example countercurrent extraction columns having packing or plates. As packing there can be used for example rings (e.g., Raschig rings), saddles (e.g., Berl saddles) or helices made of glass, ceramic or acid resistant metallic materials. As plates there can be used perforated plates, tunnel plates or bubble plates. The reaction solution is generally supplied to the top of the column and the extraction agent is supplied into the sump of the column. To strengthen the extraction efficacy the column can have pulsation.

The recovery of the extraction agent from the extract takes place, as previously mentioned, by distillative separation from the N-substituted formamide, preferably in a vacuum.

To be sure it is already known to extract N-substituted formamides out of the neutralized reaction mixture, for example using diethyl ether (see German Pat. No. 1,196,185). In this case, however, the salt formation (with its technical problems) as mentioned above has already occurred. Diethyl ether moreover is not suited as an extraction agent in the process of the invention.

The technical advantage of the process of the invention consequently is in the possibility of recovering N-alkyl formamide on a large scale industrial basis without simultaneously obtaining considerable amounts of salt as an undesired byproduct. Besides the added amount of acid is used only for the formation of the N-substituted formamide and not for the formation of a byproduct. Simultaneously, however, the N-alkyl formamide is accumulated in greater purity and with very good yields. Until now there have been no attempts to recover N-substituted formamides with these results without neutralization of the reaction solution.

As previously indicated the process is also suited for the production of N-cycloalkyl formamides and N-aralkyl formamides.

EXAMPLE 1

A mixture of 100 grams of water, 50 grams of 87 weight percent sulfuric acid and 30 grams of N-t-butyl formamide were shaken at room temperature with 100 grams of tri-n-butyl phosphate and the formation of an equilibrium awaited.

The lighter phase (134.3 grams) contained 11.5 weight percent of N-t-butyl formamide, 7.5 weight percent water, 6.6 weight percent sulfuric acid and 74.4 weight percent tri-n-butyl phosphate, the heavier phase (145.7 grams) contained 9.9 weight percent N-t-butyl formamide, 23.8 weight percent sulfuric acid and 66.3 weight percent water.

EXAMPLE 2

There were shaken at room temperature a mixture of 100 grams of water, 50 grams of 87 weight percent sulfuric acid and 60 grams of N-t-butyl formamide with 200 grams of tri-n-butyl phosphate. After the equilibrium was established there was the following distribution:

The lighter phase (280 grams) contained 14.7 weight percent of N-t-butyl formamide, 6.0 weight percent sulfuric acid, 7.8 weight percent water and 71.5 weight percent tri-n-butyl phosphate, the heavier phase (130 grams) contained 14.5 weight percent N-t-butyl formamide, 20.4 weight percent sulfuric acid and 65.1 weight percent water.

EXAMPLE 3

A mixture of 10 grams of N-t-butyl formamide in 50 grams of water and 50 grams of 87 weight percent sulfuric acid were shaken with 50 grams of tri-n-butyl phosphate and 5 grams of hexane at room temperature. The lighter phase (72.2 grams) contained 3.9 weight percent of N-t-butyl formamide, 12.1 weight percent sulfuric acid and 14.1 weight percent of water. The heavier aqueous phase contained 39.9 weight percent sulfuric acid, 7.8 weight percent of N-t-butyl formamide and 52.3 weight percent water.

EXAMPLE 4

A mixture of 20 grams of N-t-butyl formamide, 50 grams of 87 weight percent sulfuric acid and 150 grams of water were shaken with 50 grams of trioctyl phosphate at room temperature. The following equilibrium distribution resulted:

The lighter phase (53.0 grams) contained 0.8 weight percent sulfuric acid, 1.3 weight percent water, 3.6 weight percent N-t-butyl formamide and 94.3 weight percent of trioctyl phosphate, while there was found in the heavier phase (217.0 grams) 20 weight percent sulfuric acid, 8.1 weight percent N-t-butyl formamide and 71.9 weight percent water.

EXAMPLE 5

There were employed an 8 meter long glass column having an inner diameter of 40 mm filled with 8 mm wide Raschig rings (pulsation: 2.1 cycles per second, 3 mm up and down stroke). To the head of the column there were added at 20°C. per hour a mixture of 800 ml. of water, 230 ml of 86 weight percent of sulfuric acid and 130 grams of N-t-butyl formamide while there was added to the sump 2,200 ml of a mixture of tri-n-butyl phosphate and hexane in the ratio of 10 : 1. After the stationary condition was attained the following distribution was determined. The extract had a concentration of 3.7 weight percent sulfuric acid and 4.5 weight percent N-t-butyl formamide, the extracted reaction solution contains only 0.05 weight percent N-t-butyl formamide and 23.5 weight percent sulfuric acid.

EXAMPLE 6

In the same apparatus as that employed in Example 5 (pulsation 2.1 cycles per second, 3 mm up and down stroke) at 20°C. per hour there were added to the head of the column 800 ml of water, in the middle of the column (4 meters below the top) there was added a mixture of 230 ml of 86 weight percent sulfuric acid and 130 grams of N-t-butyl formamide and there was added to the sump 2,200 ml of a mixture of tri-n-butyl phosphate and hexane in the ratio 10 : 1. The following distribution was determined after the establishment of stationary conditions. The extract had a concentration of 1.5 weight percent of sulfuric acid and 4.2 weight percent of N-t-butyl formamide, the extracted aqueous solution had only a content of 0.05 weight percent of N-t-butyl formamide and 29.3 weight percent of sulfuric acid.

The in a given case neutralized extract can then be worked up by distillation.

In a thin film evaporator with an effective surface of 60 cm$^2$ and a subsequently provided column (20 cm long, 25 mm diameter, filled with 6 mm Raschig rings) there were continuously fed in 2,000 ml of extract per hour and at 90°C. and a vacuum of 20 Torr hexane and water were distilled off. No N-t-butyl formamide was found in the distillate.

The sump of the thin film evaporator was continuously pumped into a column (1.20 meter long, 40 mm diameter, filled with 6 mm Raschig rings) at a pressure of 1 Torr and a head temperature of 45°C. In the sump of this column there remained less than 0.05 weight percent of N-t-butyl formamide so that more than 99 percent of the extracted N-t-butyl formamide was isolated.

EXAMPLE 7

A mixture of 10 grams of N-t-butyl formamide and 30 grams of 30 weight percent sulfuric acid were shaken with 30 grams of N,N-diethyl-N',N'-dimethyl urea at room temperature and the introduction of the equilibrium awaited.

The lighter phase (40.0 grams) contained 14.5 weight percent of N-t-butyl formamide, 7.3 weight percent of water, 5.5 weight percent of sulfuric acid and 72.8 weight percent of N,N-diethyl -N',N'-dimethyl urea, the heavier phase (30.0 grams) contained 14.0 weight percent of N-t-butyl formamide, 22.8 weight percent sulfuric acid and 60.2 weight percent water as well as 3.0 weight percent N,N-diethyl-N',N'-dimethyl urea. The following Examples 8 – 18 were made by shaking a mixture of 225 gr. aqueous sulfuric acid 25 gr. N-t-butylformamide and 75 gr. of a mixture chlorinated hydrocarbons and carboxylic acids.

Table 1

| No. | 1 | 2 | 3 | 4 | 5 |
| --- | --- | --- | --- | --- | --- |
| 8 | 29,4 | Chloroform, acetic acid | 80 : 20 | 6,96 | 1,22 |
| 9 | 30,3 | Chloroform, proponic acid | 80 : 20 | 6,56 | 1,64 |
| 10 | 29,4 | Chloroform, isobutyric acid | 80 : 20 | 6,43 | 1,77 |
| 11 | 29,4 | Chloroform, n-valeric acid | 80 : 20 | 6,51 | 1,62 |
| 12 | 29,4 | Chloroform, caproic acid | 80 : 20 | 6,43 | 1,64 |
| 13 | 29,7 | Chloroform, trichloroacetic acid | 80 : 20 | 4,88 | 2,89 |
| 14 | 29,7 | Chloroform | | 7,85 | 0,74 |
| 15 | 29,4 | Methylene chloride, acetic acid | 80 : 20 | 7,40 | 1,12 |
| 16 | 29,7 | Chloroform, isobutyric acid | 60 : 40 | 5,61 | 2,16 |
| 17 | 27,5 | Chloroform, isobutyric acid | 50 : 50 | 4,44 | 3,71 |
| 18 | 25,1 | Chloroform, isobutyric acid | 50 : 50 | 4,61 | 3,44 |

Table 1—Continued

1 = Starting concentration in weight percent of aqueous sulfuric acid
2 = extraction mixture
3 = ratio of components (weight percent)
4 = concentration (weight percents) of N-tertiary butyl formamide in aqueous solution, equilibrium state
5 = distribution coefficient.

What is claimed is:

1. A process for the production of pure N-alkyl formamide from the aqueous solution in which it is formed in the Ritter reaction of an olefin or alcohol with hydrogen cyanide in the presence of a strong acid selected from the group consisting of sulfuric acid, hydrochloric acid, phosphoric acid and trifluoroacetic acid comprising extracting the unneutralized strongly acid solution with a polar acid stable organic solvent which is selected from the group consisting of:

(a) 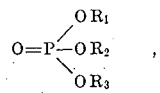

(b) 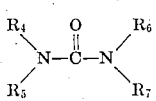

where $R_1$, $R_2$ and $R_3$ are selected from the group consisting of alkyl, aryl, and aralkyl groups and $R_1$, $R_2$ and $R_3$ together contain a total of 8 to 39 carbon atoms and $R_4$, $R_5$, $R_6$ and $R_7$ individually are selected from the group consisting of alkyl of 1–5 carbon atoms; and c. a chlorinated hydrocarbon selected from the group consisting of chloroform and methylene chloride.

2. A process according to claim 1 wherein $R_1$, $R_2$ and $R_3$ are alkyl.

3. A process according to claim 1 wherein the polar organic solvent is selected from the group consisting of:

(a) 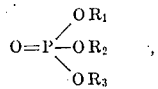

and (b) 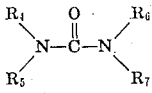

where $R_1$, $R_2$ and $R_3$ are selected from the group consisting of alkyl, aryl and aralkyl groups and $R_1$, $R_2$ and $R_3$ together contain a total of 8 to 39 carbon atoms and $R_4$, $R_5$, $R_6$ and $R_7$ individually are selected from the group consisting of alkyl of 1 – 5 carbon atoms.

4. A process according to claim 3 wherein $R_1$, $R_2$ and $R_3$ are alkyl.

5. A process according to claim 3 wherein the acid comprises sulfuric acid.

6. A process according to claim 3 wherein the polar solvent is (a).

7. A process according to claim 6 wherein the phosphate ester is the sole extracting solvent.

8. A process according to claim 6 wherein the extracting solvent is a mixture of the phosphate ester and up to 50 percent of an aliphatic, cycloaliphatic or aromatic hydrocarbon having a density up to 0.90.

9. A process according to claim 6 wherein $R_1$, $R_2$ and $R_3$ are each alkyl of 4 to 8 carbon atoms.

10. A process according to claim 6 wherein the formamide is N-t-butyl formamide.

11. A process according to claim 3 wherein the polar solvent is (b).

12. A process according to claim 11 wherein $R_4$ and $R_5$ are ethyl and $R_6$ and $R_7$ are both methyl or are both butyl.

13. A process according to claim 11 wherein the formamide is N-t-butyl formamide.

14. A process according to claim 11 wherein the tetra substituted urea is the sole extracting solvent.

15. A process according to claim 11 wherein the extracting solvent is a mixture of the tetra substituted urea and up to 50 percent of an aliphatic, cycloaliphatic or aromatic hydrocarbon having a density up to 0.90.

16. A process according to claim 1 wherein the polar solvent is selected from the group consisting of chloroform, methylene chloride and mixtures thereof with up to 50 percent of carboxylic acids of saturated hydrocarbons with 1 to 9 carbon atoms.

17. A process according to claim 16 wherein the polar solvent is chloroform.

18. A process according to claim 16 wherein the polar solvent is methylene chloride.

19. A process according to claim 16 wherein the polar solvent is a mixture of chloroform and acetic acid.

20. A process according to claim 16 wherein the polar solvent is a mixture of methylene chloride and acetic acid.

21. A process according to claim 16 wherein the polar solvent is a mixture of chloroform and isobutylic acid.

* * * * *